INVENTORS
*Hans-Martin Christiansen*
*Manfred Hanni*
BY *Spiee & Spiee* ATTORNEYS INVENTORS
HANS-MARTIN CHRISTIANSEN
MANFRED HANNI
BY S Lee & S Lee ATTORNEYS United States Patent Office 3,426,296
Patented Feb. 4, 1969

3,426,296

PULSE MODULATED COUNTING CIRCUIT WITH AUTOMATIC STOP MEANS

Hans-Martin Christiansen, Munich-Solln, and Manfred Hanni, Munich, Germany, assignors to Siemens Aktiengesellschaft, Munich, Germany, a corporation of Germany Filed Oct. 22, 1965, Ser. No. 501,756
U.S. Cl. 332—9 6 Claims
Int. Cl. H03k 7/02

ABSTRACT OF THE DISCLOSURE

A pulse modulated and counting circuit including a sampling circuit for receiving signal information to be evaluated, a pulse modulator connected to the sampling circuit, a start-stop generator connected to the pulse modulator, a binary counter circuit connected to the start-stop generator, and circuit means connected between the output of the binary counter and controllably connected to the start-stop generator for stopping the generator when the binary counter has reached its maximum count.

This invention relates to electric pulse-code modulator circuit arrangements.

More particularly this invention relates to electric pulse-code modulator circuit arrangements of the type, for use in telecommunications or measuring systems, including a sampling arrangement which samples the incoming signal, a pulse modulator arrangement which converts the signal samples into a pulse-duration modulated signal, and a start-stop generator to which the pulse-duration modulated signal is supplied, and which, for the duration of each pulse in the pulse-duration modulated signal, supplies an alternating current signal of predetermined frequency to the input of a binary counter having $n$ stages, on which $n$ stages the elements of the required code signal appear in parallel at the end of each duration modulated pulse, which elements are fed, by way of switches which are operated by a transfer pulse in synchronism with the input signal sampling, to an output modulator arrangement.

In arrangements of the above type, the amplitude of the input signal to be coded must be very sharply limited, since otherwise large signal distortions cannot be avoided. With regard to the negative signal amplitude, this requirement can be satisfied in a simple manner thereby, that the input signal has a direct current signal of suitable magnitude superimposed thereon, such that the signal presented to the sampling arrangement has positive values only, the maximum negative amplitude being associated with the value "Zero." When this value appears the start-stop generator does not respond, i.e., the binary counter does not become operative but remains in its zero-position. By contrast, the sharp definition of the maximum positive amplitude of the input signal gives rise to considerable difficulties, because the definition effected with conventional means, for example, diodes, has a transition region which cannot be neglected. This means that the binary counter cannot normally be used up to its maximum counting capacity, because a surpassing of this capacity must be avoided. This circumstance restricts the use of telecommunications systems including arrangements of this type, and also results in an increase of the quantization noise.

One object of the present invention is to provide an electric pulse-code modulator circuit arrangement of the type specified in which the above-discussed problems are overcome at least in part.

According to the present invention, there is provided an electric pulse-modulator arrangement of the type specified including a switching arrangement which is connected to said binary counter in such a manner that when the maximum counting capacity of said binary counter is reached the counting process is interrupted.

Said switching arrangement may be connected to said binary counter by way of a logic circuit arrangement.

The invention is based on the observation that the required limitation does not have to be applied directly to the amplitude of the input signal but that it suffices to stop the binary counter when it reaches its maximum counting capacity or when it is ensured that even when this capacity is exceeded, only that code combination will appear at the output of the modulator which corresponds to the maximum counting capacity of the binary counter.

Said switching arrangement may comprise a blocking gate which is connected between said start-stop generator and said binary counter, and an AND-gate having $n$ inputs, the output of said AND-gate being connected to the blocking input of said blocking gate and said $n$ AND-gate inputs being respectively connected to the "One" outputs of the $n$ stages of said binary counter.

In modulators designed for high counting speeds, there exists the risk that owing to the unavoidable switching time of the switching arrangement the counting process may be interrupted only after the binary counter has already reached and exceeded its maximum counting capacity. In this case, the modulator would give out the code combination corresponding to the maximum positive value instead of the code combination corresponding to the maximum negative value. For this reason, in modulators for high speed counting said switching arrangement may comprise a pulse-forming network which is connected to one of the two outputs of the $n$th stage of said binary counter, and $n$ changeover switches which are controlled by said pulse-forming network, which changeover switches, when in the rest position respectively connect the $n$ binary counter stage "One" outputs, by way of $n$ transfer-pulse controlled switches, to the inputs of an $n$ stage shift register, and when in the operated position respectively connect said $n$ binary counter stage "One" outputs to a code store, said pulse-forming network being such that the pulses formed thereby and supplied to said changeover switches overlap the transfer pulses supplied to said transfer-pulse controlled switches.

Said pulses supplied by said pulse-forming network may control means which controls the duration of said duration-modulated pulses.

Said pulse-forming network may comprise a bistable multivibrator, one input of which is connected to the "Zero" output of the $n$th stage of said binary counter by way of a differentiating element, and to the second input of which resetting pulses are supplied to reset said binary counter after each counting process.

Said means may be a diode.

Said pulse-modulator arrangement may comprise an electronic switch which is controlled by the discharge time of a capacitor.

Two embodiments of arrangements in accordance with the present invention will now be described by way of example with reference to the accompanying drawings, in which.

Figure 1:
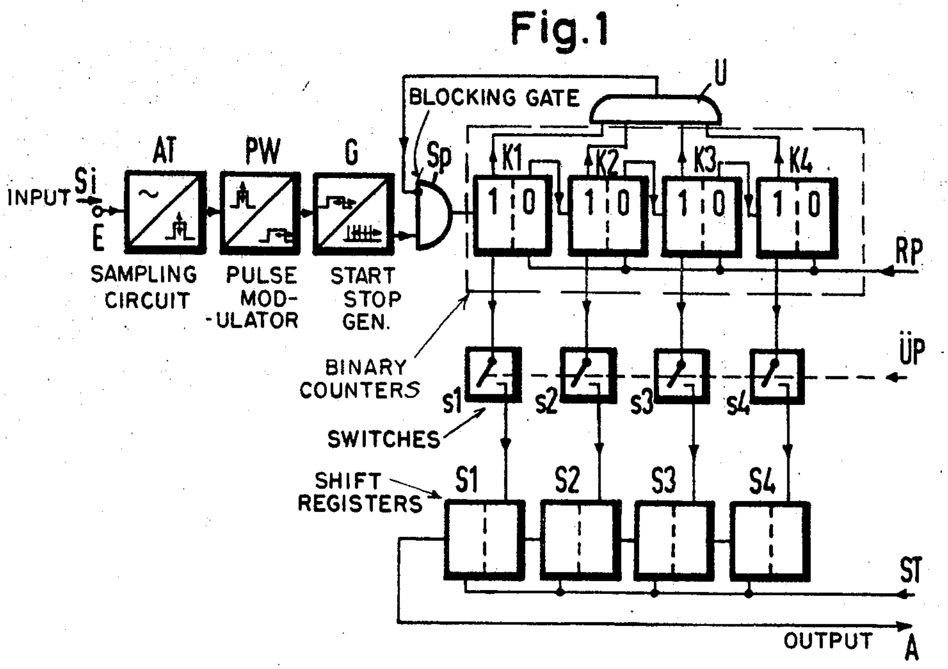
FIGURE 1 is a block schematic diagram of the first embodiment.

Referring now to FIGURE 1, the arrangement includes a sampling arrangement AT to which the input signal $Si$ is fed by way of an input E. The sampling arrangement AT samples the input signal at a frequency at least double the highest input signal frequency, and feeds the amplitude-modulated, pulse-shaped signal samples to a pulse-modulator arrangement PW, which converts the signal samples into duration-modulated pulses. The pulse-modulator arrangement PW is followed by a start-stop generator G, which for the duration of a duration-modulated pulse supplied to its input feeds a number of pulses proportional to this duration through a blocking gate S*p* to a binary counter consisting of counting stages K1 to K4. The counting stages K1 to K4 are bistable multivibrators, the "One" outputs of which are connected by way of switches *s*1 to *s*4 which are open in the rest position, with the four inputs of a shift register having four stages S1 to S4. After each counting process, the desired code signal appears in conventional binary code form at the "One" outputs of the counting stages K1 to K4 and is fed under the control of a transfer pulse ÜP controlling the switches *s*1 to *s*4 into the shift register, which in turn under the control of a shift pulse ST fed to its stages S1 to S4 supplies the elements of the code signal through an output A in series, which elements originally appeared in parallel at the outputs of the binary counter. After termination of a transfer pulse ÜP the counter is reset into its "Zero" position by means of a resetting pulse RP fed to its stages, in preparation for a new counting process.

The interruption of the counting process when the last counting stage of the counter is reached is effected by means of the blocking gate S*p* in conjunction with an AND-gate U, the four inputs of which are linked with the "One" outputs of the counting stages K1 to K4, and which acts with its output on the blocking input of the blocking gate S*p*. The AND-gate U constitutes a simple logic circuit arrangement which, through the blocking gate S*p*, prevents the feed of further pulses to the input of the counter, by issuing a pulse as soon as a "One" signal appears simultaneously on all its four inputs, as this code combination corresponds to the maximum counting capacity of the counter. This ensures that the counter shall feed a quadruple "One" to the shift register even when the duration of the duration-modulated pulses controlling the start-stop generator G causes a number of counting pulses in excess of those required for the counter to reach its last stage to be supplied to the counter.

Figure 2:
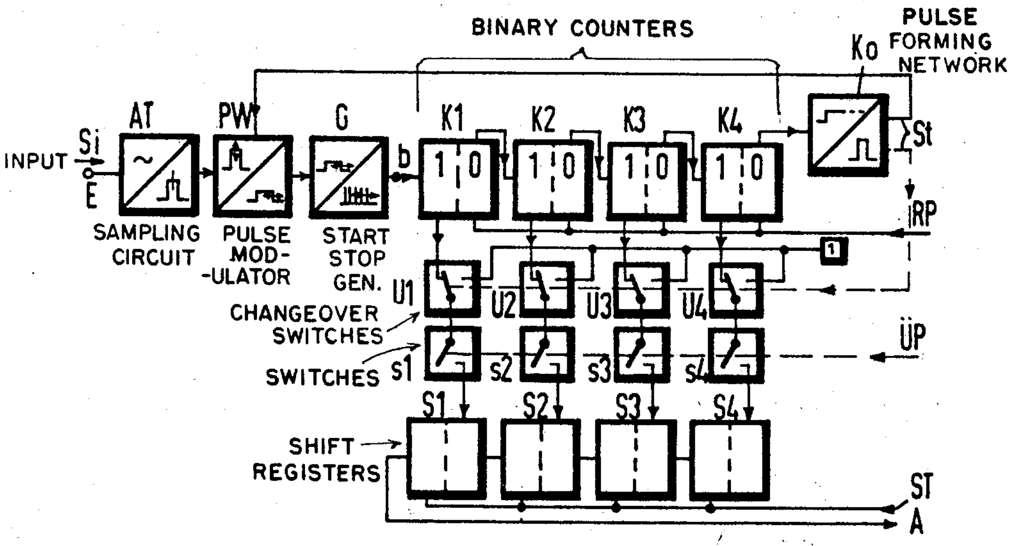
FIGURE 2 is a block schematic diagram of the second embodiment.

Referring now to FIGURE 2, this shows an arrangement, suitable for modulators operating at high and very high counting speeds, and in which for this reason the switching time of the limiting switching arrangement cannot be neglected. Here, a start-stop generator G is connected directly to the input of a counter. The switching arrangement consists of a pulse-forming network K*o*, which is connected with its input to the "Zero" output of the last counting stage K4. The pulse-forming network K*o* controls firstly a switch which effects the limiting of the duration-modulated pulses, to be explained in detail below, and four changeover switches *u*1 to *u*4 which, in the rest position, connect four switches *s*1 to *s*4 with the "One" outputs of the counting stages, and in the operative position, with the output of a "One" store.

Figure 3:
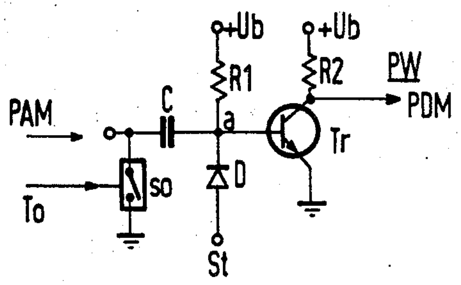
FIGURE 3 is a circuit diagram of a modulator arrangement for use in the arrangement of FIGURE 2.
Figure 4:
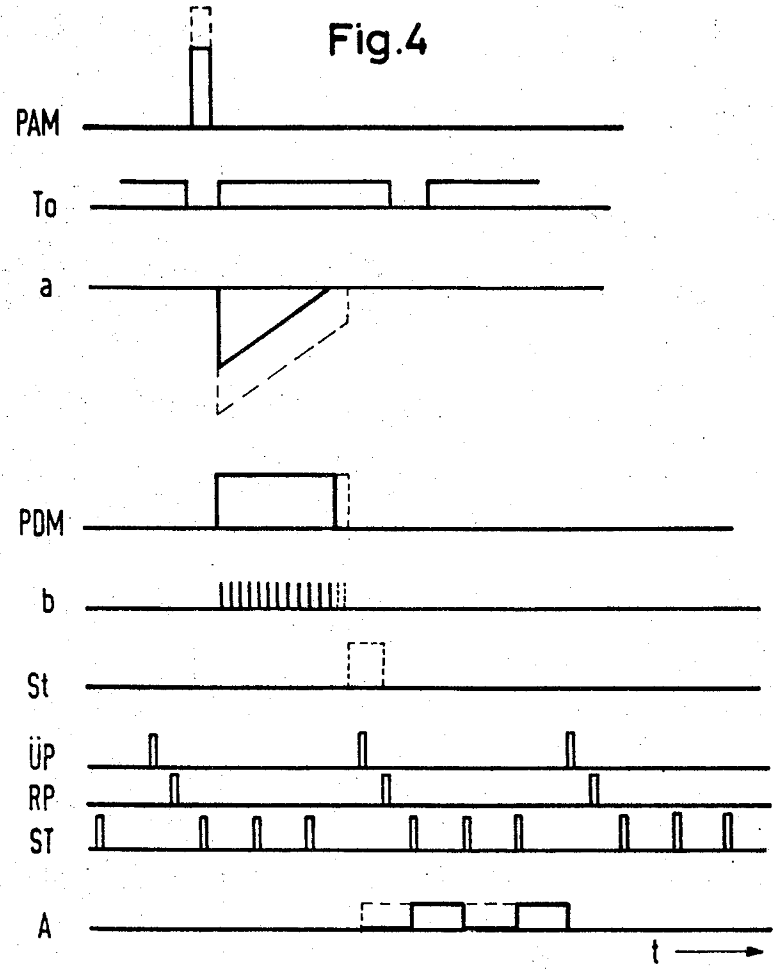
FIGURE 4 is a time diagram of various signals occurring in the arrangement of FIGURE 2.

The operation of the arrangement of FIGURE 2 will now be described with reference to FIGURES 3 and 4. FIGURE 3 illustrates a pulse-modulator arrangement and FIGURE 4 shows in a time-diagram the most important voltages occurring in this arrangement.

The pulse-modulator arrangement PW shown in FIGURE 3 consists of a transistor T*r* in a common emitter circuit, to the base electrode of which the pulse-amplitude modulated signal PAM is fed by way of a reservoir capacitor C. This signal PAM is shown in the uppermost diagram of FIGURE 4, where the amplitude indicated by broken line illustrates the case of an excessively great amplitude. The signal samples charge the capacitor C through the emitter-base circuit of the transistor T*r* to their amplitude. Immediately after termination of an amplitude-modulated pulse a switch $s_0$ in parallel with the input of the pulse-modulator arrangement is closed with the aid of a pulse T*o* (diagram T*o*). At this, a negative voltage is applied to the base electrode of the transistor T*r*, which is conducting in the reset state (diagram *a*), which negative voltage renders the transistor T*r* non-conducting and the rate of discharge of the reservoir capacitor C through the resistance R1 decreases approximately linearly with respect to the positive operating unidirectional voltage U*b*. Diagram *a* in FIGURE 4 shows, again in broken lines, the voltage curve corresponding to an excessively great amplitude of an amplitude-modulated pulse. The transistor T*r* remains non-conductive until the voltage applied to its base electrode exceeds the reference potential at its emitter electrode. Thus, owing to the voltage drop on the collector resistance R2, there appears on the collector electrode a square pulse, the duration of which is proportional to the amplitude of the signal sample. This pulse is illustrated in FIGURE 4 in the diagram referenced PDM. The duration-modulated pulses control the start-stop generator G according to FIGURE 2, at the output *b* of which a number of pulses proportional to the duration (diagram *b*) of each pulse is fed to the counter. If the duration of a duration-modulated pulse produces a number of counting pulses which is greater than the number required for the counter to reach its maximum capacity, i.e. the last counting stage trips from its "One" position into the "Zero" position, then a stopping pulse S*t* is supplied by way of the pulse-forming network K*o*, which stopping pulse S*t* brings the changeover switches *u*1 to *u*4 into the operative position and, through a diode D raises the base electrode potential of the transistor T*r* beyond the reference potential at the emitter electrode and thereby treminates the duration-modulated pulse at the output of the pulse-modulator arrangement. The width of the stopping pulse S*t* illustrated in the S*t*-diagram of FIGURE 4 is so selected that the transfer pulse appearing at the end of each counting process (diagram ÜP in FIGURE 4) is overlapped by the stopping pulse S*t*. If, therefore, the switches *s*1 to *s*4 are closed by the transfer pulse, then in each stage of the shift register a "One" will be stored in the desired sense, although the counter has already counted beyond the code combination 1 1 1 1 corresponding to its maximum counting capacity, FIGURE 4 shows in the diagram RP the resetting pulse, in diagram ST the shifting pulse, and in the diagram A the code signal appearing at the output of the shift register.

As already mentioned, the pulse-forming network T*o* may be constituted by a bistable multivibrator, which at its input side is connected through a differentiating network to the "Zero" output of the last counting stage K4. The resetting of this bistable multivibrator into its initial position can be effected by the resetting pulse. The pulse-forming network T*o* can alternatively be connected on the input side to the "One" output of the last counting stage K4. However, the connection shown in FIGURE 2 is more advantageous, because with it the limiter circuit becomes operative only when the counter exceeds its maximum counting capacity.

Instead of a cutting of the duration-modulated pulses or a blocking of the counter input, the counting process may also be interrupted in other ways to effect limiting. For example, the stopping pulse at the output of the AND-gate in the arrangement of FIGURE 1 or at the output of the pulse-forming network T*o* in the arrangement of FIGURE 2 can also be employed directly for stopping the start-stop generator G.

What we claim is:

1. A pulse modulated and counting circuit, comprising: a sampling circuit for receiving input signals and developing at the output thereof amplitude modulated pulses indicative of said input signals; a pulse modulator having input and output terminals, said input terminal connected to the output terminal of said sampling circuit, said pulse modulator converting the amplitude modulated pulse into duration-modulated pulses; a start-stop generator having an input and an output, the input thereof connected to the output terminal of said pulse modulator, said start-stop generator developing a series of pulses, the number of said series of pulses being indicative of the duration of said duration-modulated pulse; a binary counter having an input and a plurality of output terminals, the input of said binary counter being connected to the output of said start-stop generator, and circuit means connected to at least one of the outputs of said binary counter and controllably connected to said start-stop generator, whereby a full count registered by said binary counter will energize said circuit means to prevent additional pulses in excess of the count capacity of said counter from being delivered to said counter.

2. A pulse modulated and counting circuit according to claim 1 further including a plurality of shift registers; and switch means connected between the plurality of outputs of said binary counter and said plurality of shift registers, whereby the final count registered by said binary counter is delivered to said shift register when said switch means is actuated.

3. A pulse modulated and counting circuit, comprising a sampling circuit for receiving input signals and delivering at the output thereof amplitude modulated pulses indicative of said input signals; a pulse modulator having input and output terminals, said input terminal connected to the output of said sampling circuit, said pulse modulator converting the amplitude modulated pulses to duration-modulated pulses; a start-stop generator having an input and an output, the input thereof connected to the output terminal of said pulse modulator, said start-stop generator developing a series of pulses, the number of said series of pulses being indicative of the duration of said duration-modulated pulse; a first gate circuit having first and second inputs and an output, said first input being connected to the output of said start-stop generator; a binary counter having an input and a plurality of parallel outputs, the input of said binary counter being connected to the output of said first gate circuit; and a second gate circuit having a plurality of inputs and an output, the output of said second gate circuit being connected to the second input of said gate circuit, said plurality of inputs of said second gate circuit being connected to respective ones of said plurality of parallel outputs of said binary counter; whereby, a full count registered by said binary counter will energize said second gate circuit to block said first gate circuit and prevent additional pulses in excess of the count capacity of said counter from being delivered to said counter.

4. A pulse modulated and counting circuit according to claim 3 further including a plurality of shift registers; and switch means connected between said plurality of parallel outputs of said binary counter and said plurality of shift registers, whereby the final count registered by said binary counter is delivered to said shift register when said switch means is actuated.

5. A pulse modulated and counting circuit, comprising: a sampling circuit for receiving input signals and delivering at the output thereof amplitude modulated pulses indicative of said input signals; a pulse modulator having input and output terminals, said input terminal connected to the output of said sampling circuit, said pulse modulator converting amplitude modulated pulses into duration-modulated pulses; a start-stop generator having an input and an output, the input thereof connected to the output terminal of said pulse modulator, said start-stop generator developing a series of pulses, the number of said series of pulses being indicative of the duration of said duration-modulated pulses; a binary counter having an input and a plurality of parallel outputs, the input of said binary counter being connected to the output of said start-stop generator; and a pulse forming network connected between the last stage of said binary counter and said pulse modulator; whereby, a full count registered by said binary counter will energize said pulse forming network to disable said pulse modulator and prevent additional pulses in excess of the count capacity of said counter from being delivered to said counter.

6. A pulse modulated and counting circuit according to claim 5 further including a plurality of shift registers; and switch means connected between the plurality of parallel outputs of said binary counter and said plurality of shift registers, whereby a final count registered by said binary counter is delivered to said shift register when said switch means is actuated.

References Cited

UNITED STATES PATENTS

| | | | |
|---|---|---|---|
| 2,404,047 | 7/1946 | Flory et al. | |
| 2,539,623 | 1/1951 | Heising | 328—41 X |
| 2,905,815 | 9/1959 | Goodrich | 332—9 X |
| 3,046,414 | 7/1962 | Meissen | 332—9 X |
| 3,068,421 | 12/1962 | Duerdoth | 332—9 X |
| 3,136,961 | 6/1964 | Schraivogel | 332—1 X |

ALFRED L. BRODY, *Primary Examiner.*

U.S. Cl. X.R.

332—11; 307—220, 261; 328—41, 48, 58; 325—141, 38